United States Patent
Khanna et al.

(10) Patent No.: US 10,220,301 B1
(45) Date of Patent: Mar. 5, 2019

(54) PROVIDING CONTENT TO A SCROLLABLE USER INTERFACE

(71) Applicant: Zynga Inc., San Francisco, CA (US)

(72) Inventors: Nishchaie Khanna, San Mateo, CA (US); Shivkumar Ramamurthi, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 1102 days.

(21) Appl. No.: 13/709,700

(22) Filed: Dec. 10, 2012

Related U.S. Application Data

(60) Provisional application No. 61/703,437, filed on Sep. 20, 2012, provisional application No. 61/724,087, filed on Nov. 8, 2012.

(51) Int. Cl.
*G06Q 30/00* (2012.01)
*G06F 3/048* (2013.01)
*A63F 13/00* (2014.01)

(52) U.S. Cl.
CPC ............. *A63F 13/00* (2013.01); *G06Q 30/00* (2013.01); *G06F 3/048* (2013.01)

(58) Field of Classification Search
CPC ............. G06F 17/30902; G06F 3/0485; G06F 3/04855; A63F 13/12
See application file for complete search history.

(56) References Cited

U.S. PATENT DOCUMENTS

| | | | | |
|---|---|---|---|---|
| 8,868,570 B1 * | 10/2014 | Skut | .................. | G06F 17/30864 706/45 |
| 2006/0287105 A1 * | 12/2006 | Willis | ...................... | A63F 13/12 463/42 |
| 2007/0099708 A1 * | 5/2007 | Okada | ...................... | A63F 13/08 463/46 |
| 2009/0300144 A1 * | 12/2009 | Marr | ........................ | A63F 13/12 709/219 |
| 2010/0145924 A1 * | 6/2010 | Zabramski | ........ | G06F 17/30905 707/709 |
| 2012/0015747 A1 * | 1/2012 | Ocko | ....................... | A63F 13/10 463/42 |
| 2012/0302351 A1 * | 11/2012 | Murphy | ................... | A63F 13/10 463/42 |
| 2013/0065681 A1 * | 3/2013 | Olomskiy | ............... | A63F 13/12 463/31 |

(Continued)

OTHER PUBLICATIONS

"Ways to improve UIWebView scrolling performance?", Stack Overflow, [Online]. Retrieved from the Internet: <URL: http://stackoverflow.com/questions/10163879/ways-to-improve-uiwebview-scrolling-performance>, (Accessed Dec. 10, 2012), 4 pgs.

(Continued)

*Primary Examiner* — James S McClellan
*Assistant Examiner* — Syvila Weatherford
(74) *Attorney, Agent, or Firm* — Schwegman Lundberg & Woessner, P.A.

(57) ABSTRACT

Systems and methods for displaying dynamically changing content within scrollview class applications are described. In some example embodiments, an intermediate module fetches images from an underlying layer of a webview module, and provides the images to a scrollview module, which presents the images via a scrollable user interface on a computing device, such as a scrollable user interface within a game application presenting an online game via a user interface of a mobile device.

17 Claims, 10 Drawing Sheets

(56) References Cited

U.S. PATENT DOCUMENTS

2013/0073689 A1* 3/2013 Kolam .................. H04L 67/34
709/219

OTHER PUBLICATIONS

Josh, "Hybrid (Native + Web) Mobile App Development • Part 3: JavascriptCore and UIWebview optimizations", Miso Blog, [Online]. Retrieved from the Internet: <URL: http://blog.gomiso.com/2011/10/17/hybrid-native-web-mobile-app-development-%E2%80%A2-part-3-javascriptcore-and-uiwebview-optimizations/>, (Oct. 17, 2011), 3 pgs.

Bhanse, Trunal, "LinkedIn for iPad: 5 techniques for smooth infinite scrolling in HTML5", [Online]. Retrieved from the Internet: <URL: http://engineering.linkedin.com/linkedin-ipad-5-techniques-smooth-infinite-scrolling-html5>, (May 2011), 4 pgs.

* cited by examiner

PROVIDING CONTENT TO A SCROLLABLE USER INTERFACE

CROSS REFERENCE TO RELATED APPLICATIONS

This application claims priority to U.S. Provisional Patent Application No. 61/724,087, filed on Nov. 8, 2012, entitled PROVIDING CONTENT TO A SCROLLABLE USER INTERFACE, and to U.S. Provisional Patent Application No. 61/703,437, filed on Sep. 20, 2012, entitled PROVIDING CONTENT TO A SCROLLABLE USER INTERFACE, both of which are hereby incorporated by reference in their entirety.

FIELD

The present disclosure generally relates to providing content to a scrollable user interface and, more specifically, to providing dynamically changing content to a scrollable user interface presenting an online game.

BACKGROUND

Providing webview type content, such as content within a UIWebView, to a scrollview type interface, such as UIScrollView, may lead to a degradation of performance within a mobile or other application, such as a slowing of the number of frames presented within a given time period, among other drawbacks.

BRIEF DESCRIPTION OF THE DRAWINGS

The example embodiments are illustrated by way of example, and not limitation, in the figures of the accompanying drawings, in which like reference numerals indicate the same or similar elements unless otherwise indicated.

DESCRIPTION OF EXAMPLE EMBODIMENTS

Overview

An intermediate module obtains content from a webview module and provides the content to a scrollview module, when requested by the scrollview module. In some example embodiments, the intermediate module fetches images from an underlying layer of the webview module, and provides the images to the scrollview module, which presents the images via a scrollable user interface on a computing device, such as a scrollable user interface on a mobile device.

For example, a game application utilizing a scrollview class of application may request content to be displayed from a webview class of application. The intermediate module, in response to receiving the request, fetches and/or captures images of content provided by the webview class of application, and provides the images to the scrollview class of application. By presenting images of content provided by the webview class of application instead of directly inserting content from the webview class of application into the scrollview class of application, the intermediate module avoids latency effects and other drawbacks associated with such an insertion of content into the scrollview class of application, among other benefits.

These and other examples are described, by way of example, in further detail below.

Example System

Figure 1:
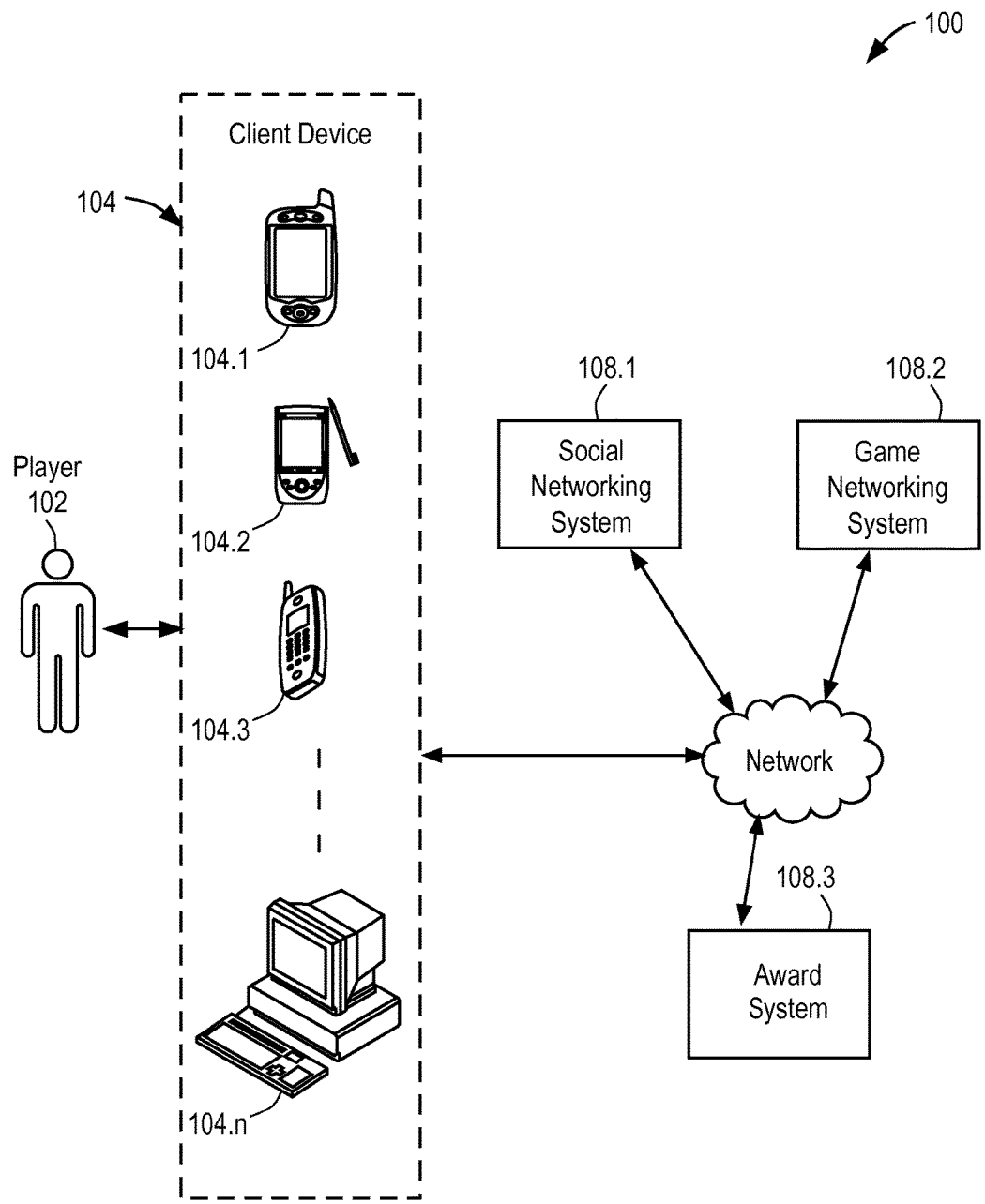
FIG. 1 shows a schematic diagram of a virtual gaming system, according to some example embodiments, in which content is provided in a scrollable user interface.

FIG. 1 shows a schematic diagram of a virtual gaming system 100, in accordance with an example embodiment, in which content is provided in a scrollable user interface. The system 100 may comprise a user device 104 associated with a player 102, a network 106, a social networking system 108.1, a game networking system 108.2, and an award system 108.3. The example components of the system 100 may be connected directly or via the network 106, which may be any suitable network. In various example embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, any other type of network, or a combination of two or more such networks.

Although FIG. 1 illustrates a particular example of the arrangement of the player 102, the user device 104, the social networking system 108.1, the game networking system 108.2, the award system 108.3, and the network 106, this disclosure includes any suitable arrangement or configuration of the player 102, the user device 104, the social networking system 108.1, the game networking system 108.2, the reward system 108.3, and the network 106.

The user device 104 may be any suitable computing device (e.g., devices 104.1-104.$n$), such as a smart phone 104.1, a personal digital assistant (PDA) 104.2, a mobile phone 104.3, a personal computer 104.$n$, a laptop, a computing tablet, or any other device suitable for playing a virtual game. The user device 104 may access the social networking system 108.1 or the game networking system 108.2 directly, via the network 106, or via a third-party system. For example, the user device 104 may access the game networking system 108.2 via the social networking system 108.1. It should be noted that the functionality described herein may reside partially or wholly on any one device or be distributed across several devices.

The social networking system 108.1 may include a network-addressable computing system that can host one or more social graphs (see, for example, FIG. 5), and may be accessed by the other components of the system 100 either directly or via the network 106. The social networking system 108.1 may generate, store, receive, and transmit social networking data.

Example Content Display System

Figure 2:
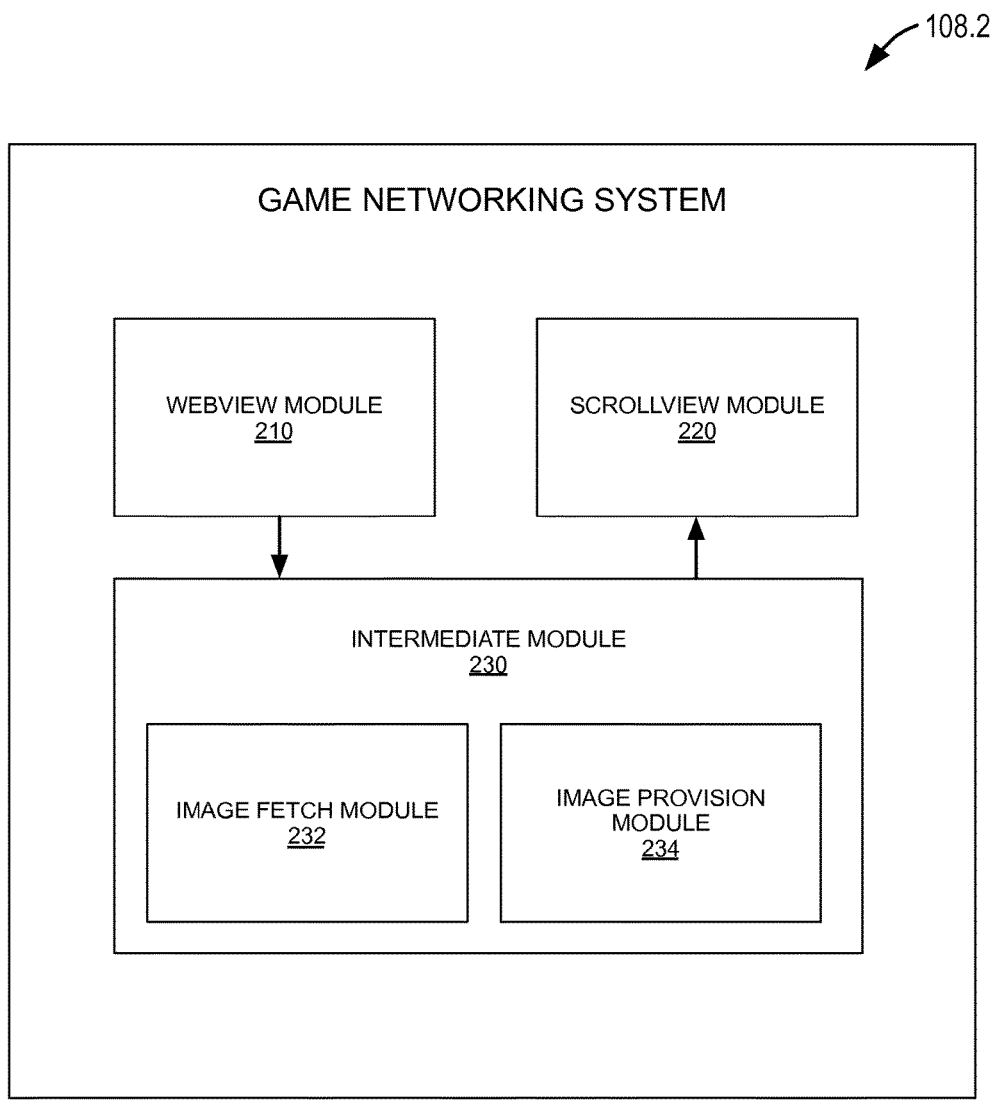
FIG. 2 shows a block diagram of a system, according to some example embodiments, to provide images to a scrollable user interface.

In some example embodiments, in order to display and/or present content (e.g., dynamically changing content) within a game application, the game networking system 108.2 may utilize a variety of different modules. FIG. 2 shows a block diagram of a system, according to some example embodiments, for providing images to a scrollable user interface.

For example, the game networking system 108.2 may include a webview module 210 that is configured and/or programmed to provide dynamically changing content for a game application, and a scrollview module 220, that is configured and/or programmed to present a number of different views of the content, such as views that may be scrolled and or navigated to by a user.

In some example embodiments, the webview module 210 may provide an application, applet, widget, and so on (e.g., UIWebView for iOS) that is configured to embed web and other dynamically changeable content, such as images, into the game application. For example, a UIWebView object that is attached to a window may load web content, move within a history of web pages, convert content to links and other navigation elements, and so on.

Within a game application, the webview module 210 may provide a variety of different types of content, such as content within game promotions, content within advertisement promotions and other sponsored content, content from a game lobby associated with a game application, content from other online games associated with a currently running online game, and so on. For example, while a user is playing an online game supported by a game application, the game application may request content from the webview module 210 in order to display, within or proximate to the display of the online game, other content associated with promotions, advertisements, other games (e.g., a current state of a game board), and so on.

In some example embodiments, the scrollview module 220 may provide an application, applet, widget, and so on (e.g., UIScrollView for iOS) that is configured to display content larger than the size of the game application's display environment. For example, the scrollview module 220 may enable a user to scroll within content by making swiping gestures, to zoom in and back from portions of the content by making pinching gestures, among other navigation features. Thus, in some example embodiments, the webview module 210 provides a game application with dynamically changeable or modifiable content, and the scrollview module 220 provides the game application with an adjustable and/or navigable view of the content, among other things.

As described herein, in some example embodiments, the game networking system 108.2 includes an intermediate module 230 configured to retrieve and/or fetch content from the webview module 210, optionally store the content (or, images of the content) and provide the content (or, images of the content) to the scrollview module 220.

The intermediate module 230 may include various components and/or modules configured and/or programmed to perform these and other tasks, such as an image fetch module 232 that is configured and/or programmed to capture and/or fetch images and other content from the webview module 210.

For example, the image fetch module 232 may perform the operations reflected in the following example code snippet when fetching/capturing images from webview module 210:

```
- (UIImage*)makeWebViewIntoImage
{
    if(!self.webViewImage)
    {
        if([self iPhoneRetina])
            UIGraphicsBeginImageContextWithOptions(webView.bounds.size, NO, 2.0f);
        else
            UIGraphicsBeginImageContext(webView.bounds.size);
        [webView.layer renderInContext:UIGraphicsGetCurrentContext( )];
        self.webViewImage=UIGraphicsGetImageFromCurrentImageContext( );
        UIGraphicsEndImageContext( );
    }
    return webViewImage;
}
```

In some example embodiments, the intermediate module 230 includes an image provision module 234 that is configured and/or programmed to provide the fetched and/or captured images and other content to the scrollview module 220, when requested by the scrollview module 220. That is, the image provision module 234 may present one or more images that depict the content provided by the webview module 210 and are displayed within an online game or other display environment provided by a game application.

As an example, a game application presenting an online game via a scrollview application wishes to show a promotion to a player of the online game. The game application sends a request for content associated with the promotion to a webview application that provides such content. The intermediate module 230 receives the request, fetches the requested content, captures images of the requested content, and fulfills the request by providing the images to the requesting scrollview application.

Figure 3:
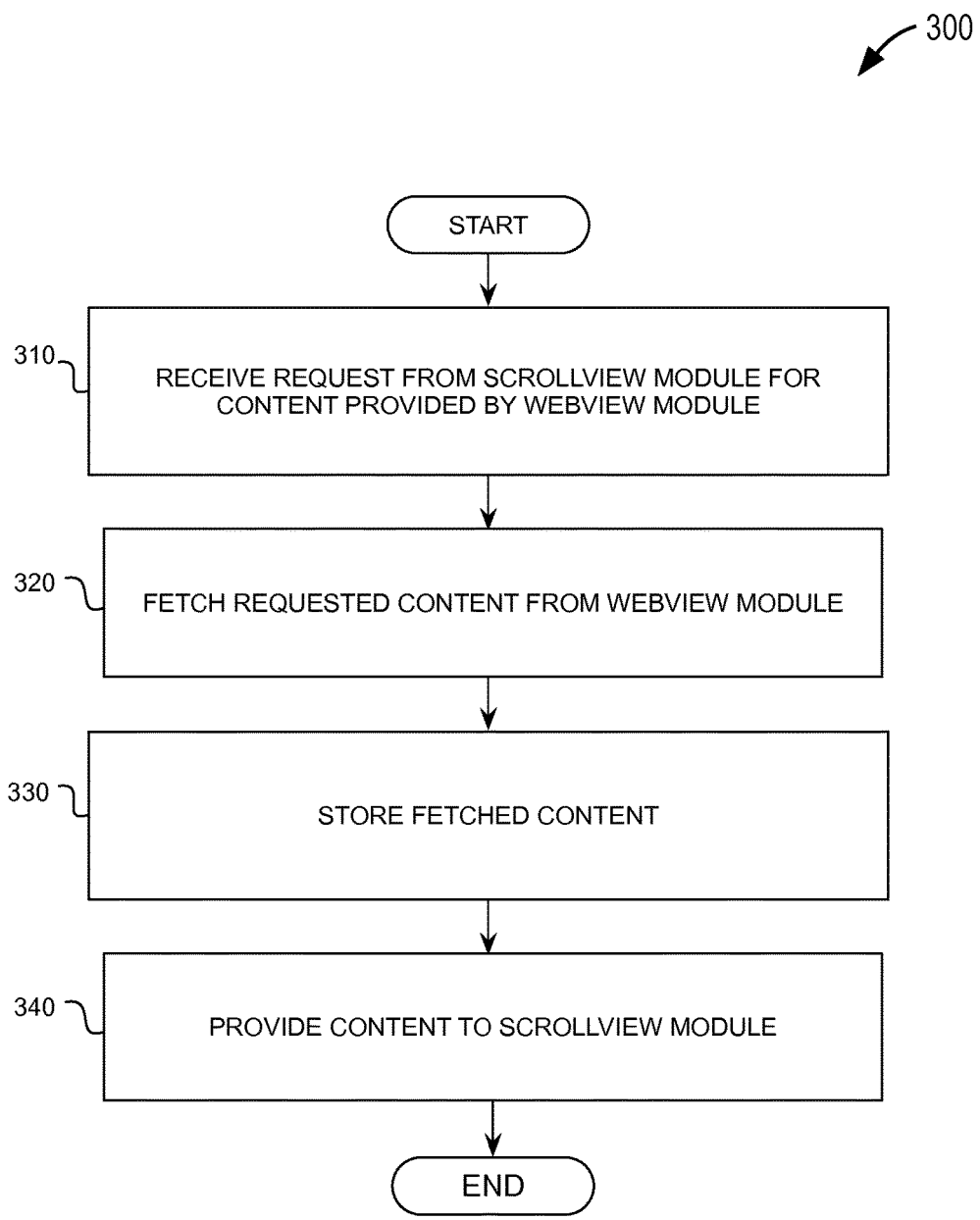
FIG. 3 shows a method, according to some example embodiments, for providing images obtained from a webview module to a scrollview module.

FIG. 3 shows a method, according to some example embodiments, for providing images obtained from a webview module to a scrollview module. In operation 310, an intermediate module, such as intermediate module 230, receives a request from a scrollview module for content provided by a webview module. For example, the image fetch module 232 of the intermediate module 230 receives an indication that a user of a game application has performed a gesture to display content outside of a current view of a game presented by the game application.

In operation 320, the system fetches the requested content from the webview module. For example, the image fetch module 232 fetches and/or captures images, such as images that provide a different view of the game, from the webview module 210, in response to the gesture.

In operation 330, the system stores the fetched content. For example, the image fetch module 232 may store fetched images in a database, buffer, cache, or other location after they are fetched from the webview module 210. In some example embodiments, the images are stored for a certain period time, such as a time period that ends when the images are displayed with the game application, when a user exits the game application, when a user navigates to a different view or location within the game, after a certain duration of time, and so on.

In operation 340, the system provides the content to a scrollview module. For example, the image provision module 234 of the intermediate module 230 provides the images to the scrollview module 220 to be displayed within the game application at the requested view.

In some example embodiments, the intermediate module 230 may provide images of different aspects of content provided by the webview module 210. For example, the intermediate module 230 may provide a first image captured of the content provided by the webview class of application to a game application, and then provide a second image captured of the content, such as a different aspect of the content, provided by the webview class of application to the game application.

Thus, in some example embodiments, providing an intermediary, such as intermediate module 230, between a webview module and a scrollview module enables an application, such as game application, to display content (e.g., images of content) at desired performance rates (e.g., at 60 frames per second) without being hindered by performance drawbacks associated with inserting dynamic content into applications, among other benefits.

Additionally, in some example embodiments, the intermediate module 230 provides direct links to different views of content presented in a scrollable interface by a game application or other application that displays content. That is, a scrollable image presented within a game application may be linked at multiple locations within the image to various content that is fetched from a webview module and stored within the intermediate module, enabling the image to act like a user-selectable web page, among other benefits.

For example, the system may utilize the following example algorithm when transforming an image into an image with clickable target regions:

```
- (void)touchesBegan:(NSSet*)touches
withEvent:(UIEvent*)event
{
    UITouch *touch=[touches anyObject];
    CGPoint  touchLocation=[touch  locationInView:
touch.view];
    CGRect  clickTargetBoundingBox1=[GameListWebVie-
wHelper getClickTargetBoundingBox1];
    CGRect  clickTargetBoundingBox2=[GameListWebVie-
wHelper getClickTargetBoundingBox2];
    int whichClickTargetClicked=kNoClickTarget;
    if    (CGRectContainsPoint(clickTargetBoundingBox1,
touchLocation))
    {
        whichClickTargetClicked=kClickTarget1;
    }
    else if(CGRectContainsPoint(clickTargetBoundingBox2,
touchLocation))
    {
        whichClickTargetClicked=kClickTarget2;
    }
    if([GameListWebViewHelper  getClickURLType:which-
ClickTargetClicked]==kShowSecondImage)
    }
    NSString *imageName;
    if([self iPhoneRetina])
        imageName=[[GameListWebViewHelper    getWeb-
            ViewClickURL:whichClickTargetClicked]  string-
            ByAppendingString:@"@2x.png"];
    else
        imageName=[[GameListWebViewHelper    getWeb-
            ViewClickURL:whichClickTargetClicked]  string-
            ByAppendingString:@".png"];
    [self addActivityIndicator];
    [self loadImageShownOnClickFromURL:imageName];
    }
    else  if([GameListWebViewHelper  getClickURLType:
whichClickTargetClicked]==kOpenExternalURL)
    {
        [self openExternalURL:whichClickTargetClicked];
    }
    if(webViewClicked==NO && whichClickTargetClicked
!=kNoClickTarget)
    {
        [self     performSelector:@selector(updateStateOfWeb-
            View)  withObject:nil afterDelay:[GameListWebVie-
            wHelper timeTheSecondImageIsShown]];
        webViewClicked=YES;
        [self issueZtrackClickCallForWebView:[NSString string-
            WithFormat:@"% d",whichClickTargetClicked]];
    }
}
- (void) updateStateOfWebView
{
    [self addWebViewClickToClientDBStore];
    if([GameListWebViewHelper   shouldHideWebViewOn-
Click])
    [gameListViewController removeWebViewCell];
    webViewClicked=NO;
}
- (void)addWebViewClickToClientDBStore
{
    [currentUser   setWebViewClickData:[GameListWebVie-
wHelper getWebViewUID]];
}
- (void)openExternalURL:(int) clickTargetIndex
{
    NSString *clickURL=[GameListWebViewHelper getWe-
bViewClickURL:clickTargetIndex];
    [[UIApplication  sharedApplication]  openURL:[NSURL
URLWithString:clickURL]];
}
- (void)addActivityIndicator
{
    [self addSubview: activityIndicator];
    [activityIndicator startAnimating];
}
- (void)dismissActivityIndicator
{
    [activityIndicator stopAnimating];
    [activityIndicator removeFromSuperview];
}
- (void)dealloc
{
    [super dealloc];
    [activityIndicator release];
}
@end
```

FIGS. 4A-4D depict example views of web-based content that is presented via a game application using some or all of the methods and systems described herein.

Figure 4A:
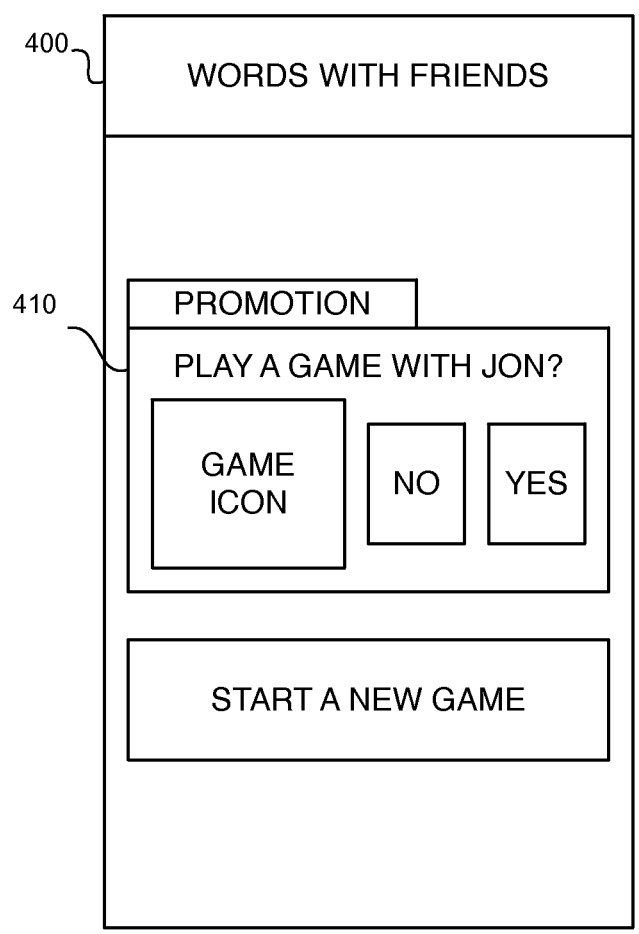
FIGS. 4A-4D depict example views of web-based content that is presented via a game application.

FIG. 4A depicts a display 400 within an online game that includes a displayed promotion 410 within the online game, where content may be pushed to make users play against different players dynamically, may generate content by changing the mark-up, and so on. The system displays the promotion via one or more images provided by the intermediate module 230, which are fetched from content associated with the promotion and provided by a webview application.

Figure 4B:
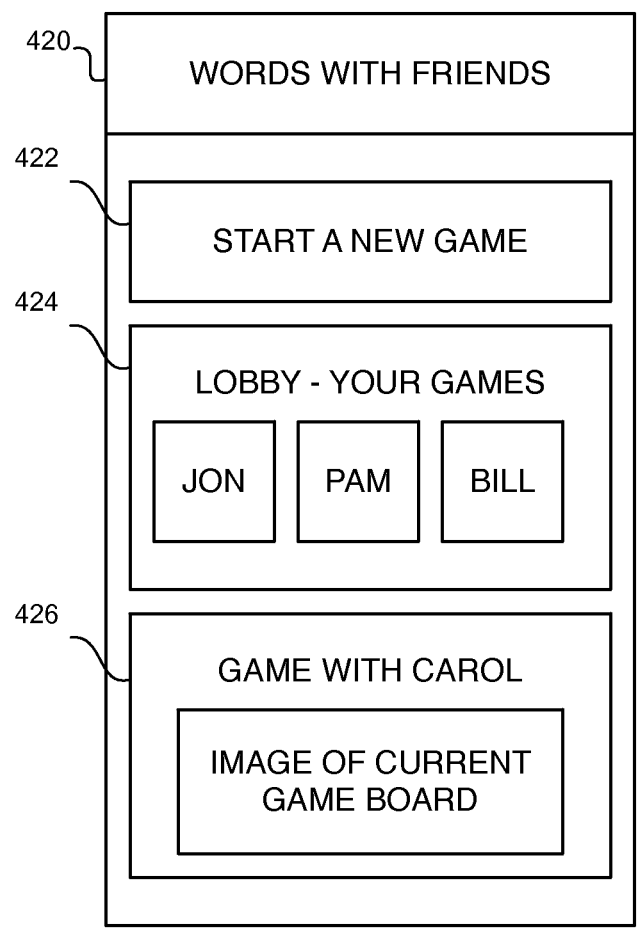

FIG. 4B depicts a display 420 of a lobby of games within a game application. The system displays content for different games and activities, such as content 422 associated with starting a new game, content 424 associated with a first game, content 426 associated with a second game, and so on, via one or more images provided by the intermediate module 230, which are fetched from dynamically changing content associated with the games and provided by a webview application.

Figure 4C:
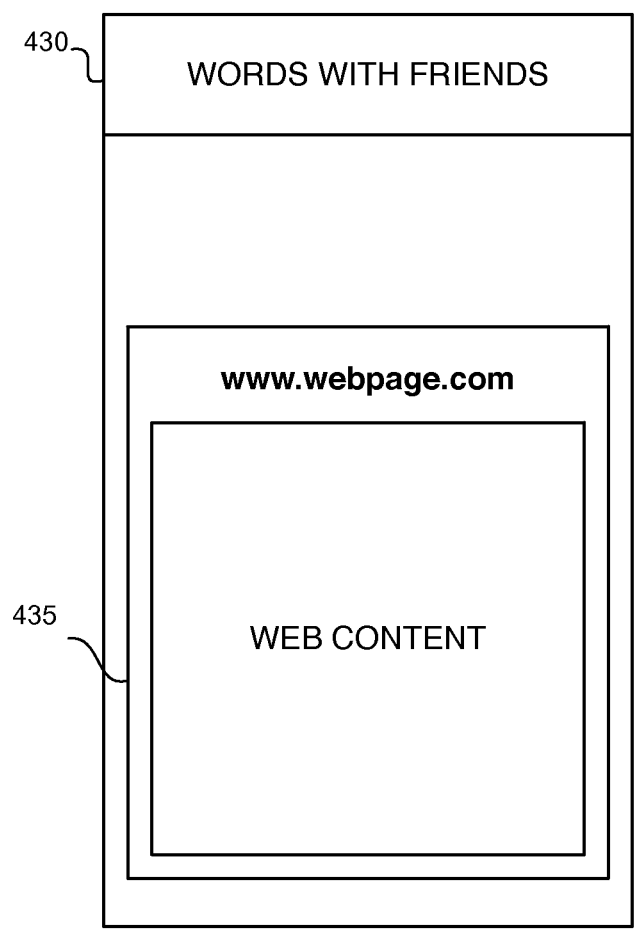

FIG. 4C depicts a display 430 of an online game that includes a website 435 displayed within the online game.

The system displays the website via one or more images provided by the intermediate module 230, which are captured from content associated with the website and provided by a webview application.

Figure 4D:
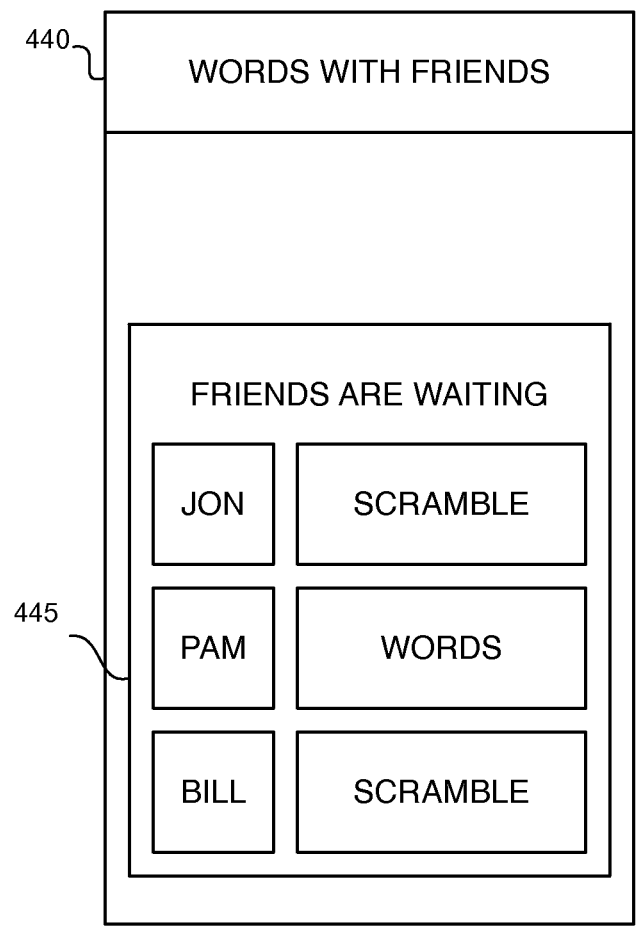

FIG. 4D depicts a display 440 of an online game that includes an interface 445 presenting available friends within the online game. The system displays the dynamically changing content (i.e., the group of available friends changes as friends enter and exit a game application, the games they are playing changes, and so on) of the interface 445 via one or more images provided by the intermediate module 230, which are captured from content associated with the interface 445 and provided by a webview application.

Of course, one of ordinary skill in the art will realize that the systems and methods described herein may be implemented in other ways.

Example Game Systems, Social Networks, and Social Graphs

Figure 5:
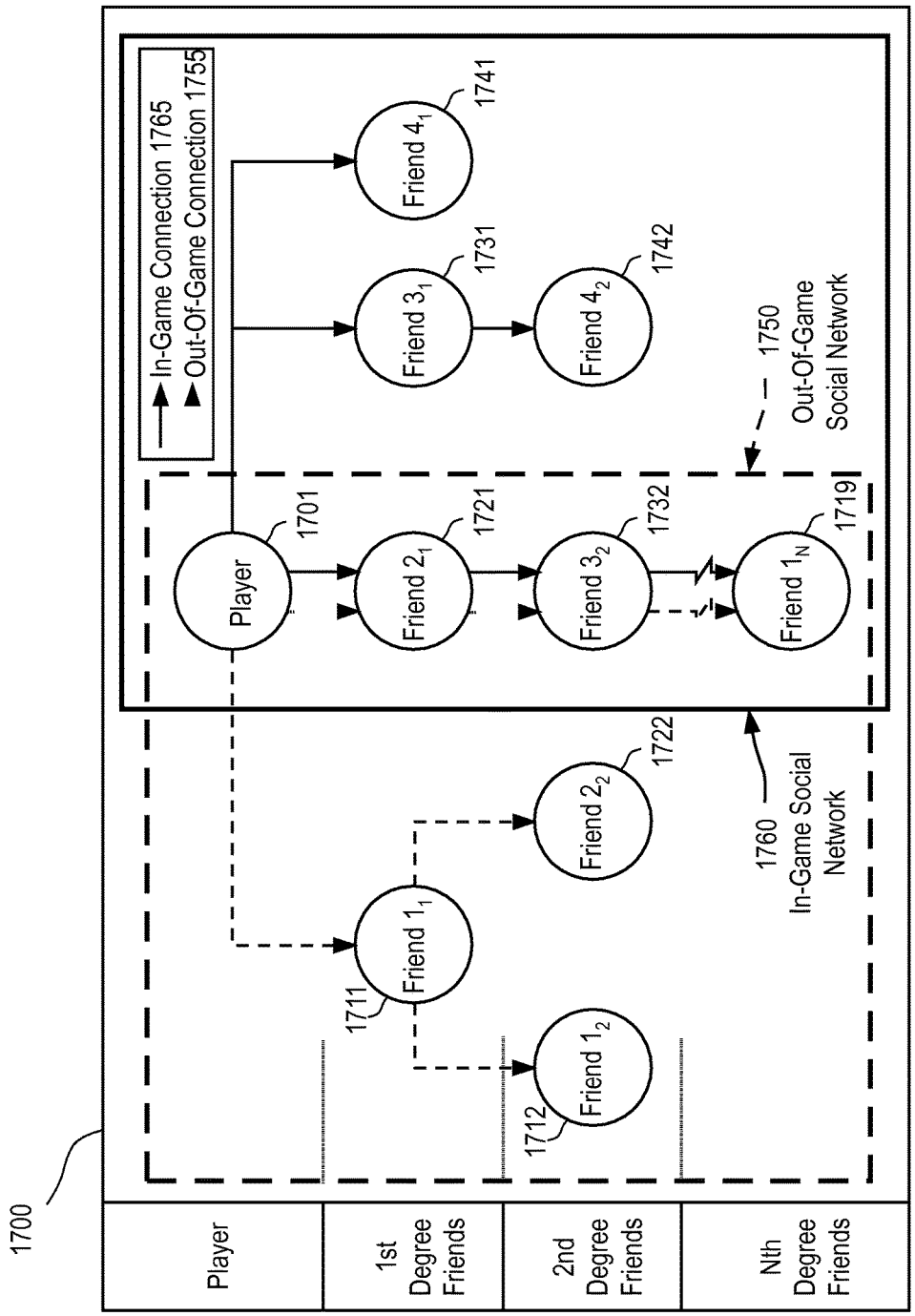
FIG. 5 shows a social network within a social graph, according to some example embodiments.

FIG. 5 shows an example of a social network within a social graph 1700. In example embodiments, a virtual landscape or environment of a player may be visible to other players of the virtual game.

The social graph 1700 is shown by way of example to include an out-of-game social network 1750 and an in-game social network 1760. Moreover, the in-game social network 1760 may include one or more players that are friends with the User 1701 (e.g., a Friend $3_1$ 1731), and may include one or more other users that are not friends with the User 1701. The social graph 1700 may correspond to the various users associated with the virtual game. In an example embodiment, each user may "build" their own virtual structures using branded virtual objects and/or unbranded virtual objects.

As described above, the example systems described herein may include, communicate, or otherwise interact with a game system. As such, a game system is now described to illustrate further example embodiments. In an online multiuser game, users control player characters (PCs), a game engine controls non-player characters (NPCs); the game engine also manages player character state and tracks states for currently active (e.g., online) users and currently inactive (e.g., offline) users. A game engine, in some embodiments, may include a documentation engine. Alternatively, the documentation engine and game engine may be embodied as separate components operated by the game network system and/or the document provision system.

A player character may have a set of attributes and a set of friends associated with the player character. As used herein, the terms "state" and "attribute" can be used interchangeably to refer to any in-game characteristic of a player character, such as location, assets (e.g., value icons), levels, condition, health, status, inventory, skill set, name, orientation, affiliation, specialty, and so on. The game engine may use a player character state to determine the outcome of a game event, while sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights, and/or benefits, or the obtaining of some assets (e.g., health, money (e.g., virtual currency from a value icon), strength, inventory, land, etc.). A game engine may determine the outcome of a game event according to game rules (e.g., "a character with less than 5 health points will be prevented from initiating an attack"), based on a character's state, and also possibly on interactions of other player characters and a random calculation. Moreover, an engagement may include simple tasks (e.g., cross the river, shoot at an opponent, interact with a value icon, or the like), complex tasks (e.g., win a battle, unlock a puzzle, build a factory, rob a liquor store), or other events.

In a game system according to some aspects of the present disclosure, in determining the outcome of a game event in a game being played by a user (or a group of more than one users), the game engine may take into account the state of the player character (or group of PCs) that is playing, but also the state of one or more PCs of offline/inactive users who are connected to the current user (or PC, or group of PCs) through the game social graph but are not necessarily involved in the game at the time.

For example, a User A with six friends on User A's team (e.g., the friends that are listed, depending on the nature of the game, as being in the user's mob/gang/set/army/business/crew/etc.) may be playing the virtual game and choose to confront a User B who has 20 friends on User B's team. In some embodiments, a user may only have first-degree friends on the user's team. In other embodiments, a user may also have second-degree and higher degree friends on the user's team. To resolve the game event, in some embodiments, the game engine may total up the weapon strength of the seven members of the User A's team and the weapon strength of the 21 members of the User B's team and decide an outcome of the confrontation based on a random variable applied to a probability distribution that favors the side with the greater total. In some embodiments, all of this may be done without any other current active participants other than the User A (e.g., the User A's friends, the User B, and the User B's friends could all be offline or inactive). In some embodiments, the friends in a user's team may see a change in their state as part of the outcome of the game event. In some embodiments, the state (assets, condition, level) of friends beyond the first degree are taken into account.

A virtual game may be hosted by the game networking system 108.2, which can be accessed using any suitable connection with a suitable user device 104. A user may have a game account on the game networking system 108.2, wherein the game account may contain a variety of information associated with the user (e.g., the user's personal information, financial information, purchase history (e.g., of in-game assets), player character state, game state, or any other user profile data). In some embodiments, a user may play multiple games on the game networking system 108.2, which may maintain a single game account for the user with respect to the multiple games, or multiple individual game accounts for each game with respect to the user. In some embodiments, the game networking system 108.2 may assign a unique identifier to a player 102 of a virtual game hosted on the game networking system 108.2. The game networking system 108.2 may determine that the player 102 is accessing the virtual game by reading the user's cookies, which may be appended to HTTP requests transmitted by the user device 104, and/or by the player 102 logging onto the virtual game.

In some embodiments, the player 102 accesses a virtual game and controls the game's progress via the user device 104 (e.g., by inputting commands to the game at the user device 104). The user device 104 can display the game interface, receive inputs from the player 102, transmit user inputs or other events to the game engine, and receive instructions from the game engine. The game engine can be executed on any suitable system (such as, for example, the user device 104, the social networking system 108.1, or the game networking system 108.2). For example, the user device 104 may download client components of a virtual game, which are executed locally, while a remote game server, such as the game networking system 108.2, provides backend support for the client components and may be responsible for maintaining application data of the game, processing the inputs from the player 102, updating and/or synchronizing the game state based on the game logic and each input from the player 102, and transmitting instructions to the user device 104. As another example, when the player 102 provides an input to the game through the user device 104 (such as, for example, by typing on the keyboard, clicking the mouse, or interacting with a touch screen of the user device 104), the client components of the game may transmit the user's input to the game networking system 108.2.

In some embodiments, the player 102 accesses particular game instances of a virtual game. A game instance is a copy of a specific game play area that is created during runtime. In some embodiments, a game instance is a discrete game play area where one or more players 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific users. A game instance is associated with a specific user when one or more game parameters of the game instance are associated with the specific user. For example, a game instance associated with a first user may be named "First User's Play Area." This game instance may be populated with the first user's PC and one or more in-game objects associated with the first user.

In some embodiments, a game instance associated with a specific user is only accessible by that specific user. For example, a first user may access a first game instance when playing a virtual game, and this first game instance may be inaccessible to all other users. In other embodiments, a game instance associated with a specific user is accessible by one or more other users, either synchronously or asynchronously with the specific user's game play. For example, a first user may be associated with a first game instance, but the first game instance may be accessed by all first-degree friends in the first user's social network.

In some embodiments, the set of in-game actions available to a specific user is different in a game instance that is associated with this user compared to a game instance that is not associated with this user. The set of in-game actions available to a specific user in a game instance associated with this user may be a subset, superset, or independent of the set of in-game actions available to this user in a game instance that is not associated with him. For example, a first user may be associated with Blackacre Farm in an online farming game and may be able to plant crops on Blackacre Farm. If the first user accesses a game instance associated with another user, such as Whiteacre Farm, the game engine may not allow the first user to plant crops in that game instance. However, other in-game actions may be available to the first user, such as watering or fertilizing crops on Whiteacre Farm. Likewise, value icons may have restrictions.

In some embodiments, a game engine interfaces with a social graph. Social graphs are models of connections between entities (e.g., individuals, users, contacts, friends, users, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a user or player character in an online multiuser game.

In some embodiments, the social graph is managed by the game networking system 108.2, which is managed by the game operator. In other embodiments, the social graph is part of a social networking system 108.1 managed by a third party (e.g., Facebook, Friendster, Myspace). In yet other embodiments, the player 102 has a social network on both the game networking system 108.2 and the social networking system 108.1, wherein the player 102 can have a social network on the game networking system 108.2 that is a subset, superset, or independent of the user's social network on the social networking system 108.1. In such combined systems, game network system 108.2 can maintain social graph information with edge-type attributes that indicate whether a given friend is an "in-game friend," an "out-of-game friend," or both. The various embodiments disclosed herein are operable when the social graph is managed by the social networking system 108.1, the game networking system 108.2, or both.

Returning to FIG. 5, the User 1701 may be associated, connected, or linked to various other users, or "friends," within the out-of-game social network 1750. These associations, connections, or links can track relationships between users within the out-of-game social network 1750 and are commonly referred to as online "friends" or "friendships" between users. Each friend or friendship in a particular user's social network within a social graph is commonly referred to as a "node." For purposes of illustration, the details of out-of-game social network 1750 are described in relation to User 1701. As used herein, the terms "user" and "player" can be used interchangeably and can refer to any user in an online multiuser game system or social networking system. As used herein, the term "friend" can mean any node within a user's social network.

As shown in FIG. 5, User 1701 has direct connections with several friends. When the User 1701 has a direct connection with another individual, that connection is referred to as a first-degree friend. In out-of-game social network 1750, the User 1701 has two first-degree friends. That is, the User 1701 is directly connected to Friend $1_1$ 1711 and Friend $2_1$ 1721. In social graph 1700, it is possible for individuals to be connected to other individuals through their first-degree friends (e.g., friends of friends). As described above, the number of edges in a minimum path that connects a user to another user is considered the degree of separation. For example, FIG. 5 shows that User 1701 has three second-degree friends to which User 1701 is connected via User 1701's connection to User 1701's first-degree friends. Second-degree Friend $1_2$ 1712 and Friend $2_2$ 1722 are connected to User 1701 via User 1701's first-degree Friend $1_1$ 1711. The limit on the depth of friend connections, or the number of degrees of separation for associations, that User 1701 is allowed is typically dictated by the restrictions and policies implemented by the social networking system 108.1.

In various embodiments, User 1701 can have Nth-degree friends connected to him through a chain of intermediary degree friends as indicated in FIG. 5. For example, Nth-degree Friend $1_N$ 1719 is connected to User 1701 within in-game social network 1760 via second-degree Friend $3_2$ 1732 and one or more other higher-degree friends.

In some embodiments, a user (or player/player character) has a social graph within an online multiuser game that is maintained by the game engine and another social graph maintained by a separate social networking system. FIG. 5 depicts an example of in-game social network 1760 and out-of-game social network 1750. In this example, User 1701 has out-of-game connections 1755 to a plurality of friends, forming out-of-game social network 1750. Here, Friend $1_1$ 1711 and Friend $2_1$ 1721 are first-degree friends with User 1701 in User 1701's out-of-game social network 1750. User 1701 also has in-game connections 1765 to a plurality of users, forming in-game social network 1760. Here, Friend $2_1$ 1721, Friend $3_1$ 1731, and Friend $4_1$ 1741 are first-degree friends with User 1701 in User 1701's in-game social network 1760. In some embodiments, a game engine can access in-game social network 1760, out-of-game social network 1750, or both.

In some embodiments, the connections in a user's in-game social network are formed both explicitly (e.g., when users "friend" each other) and implicitly (e.g., when the system observes user behaviors and "friends" users to each other). Unless otherwise indicated, reference to a friend connection between two or more users can be interpreted to cover both explicit and implicit connections, using one or more social graphs and other factors to infer friend connections. The friend connections can be unidirectional or bidirectional. It is also not a limitation of this description that two users who are deemed "friends" for the purposes of this disclosure are not friends in real life (e.g., in disintermediated interactions or the like), but that could be the case.

Figure 6:
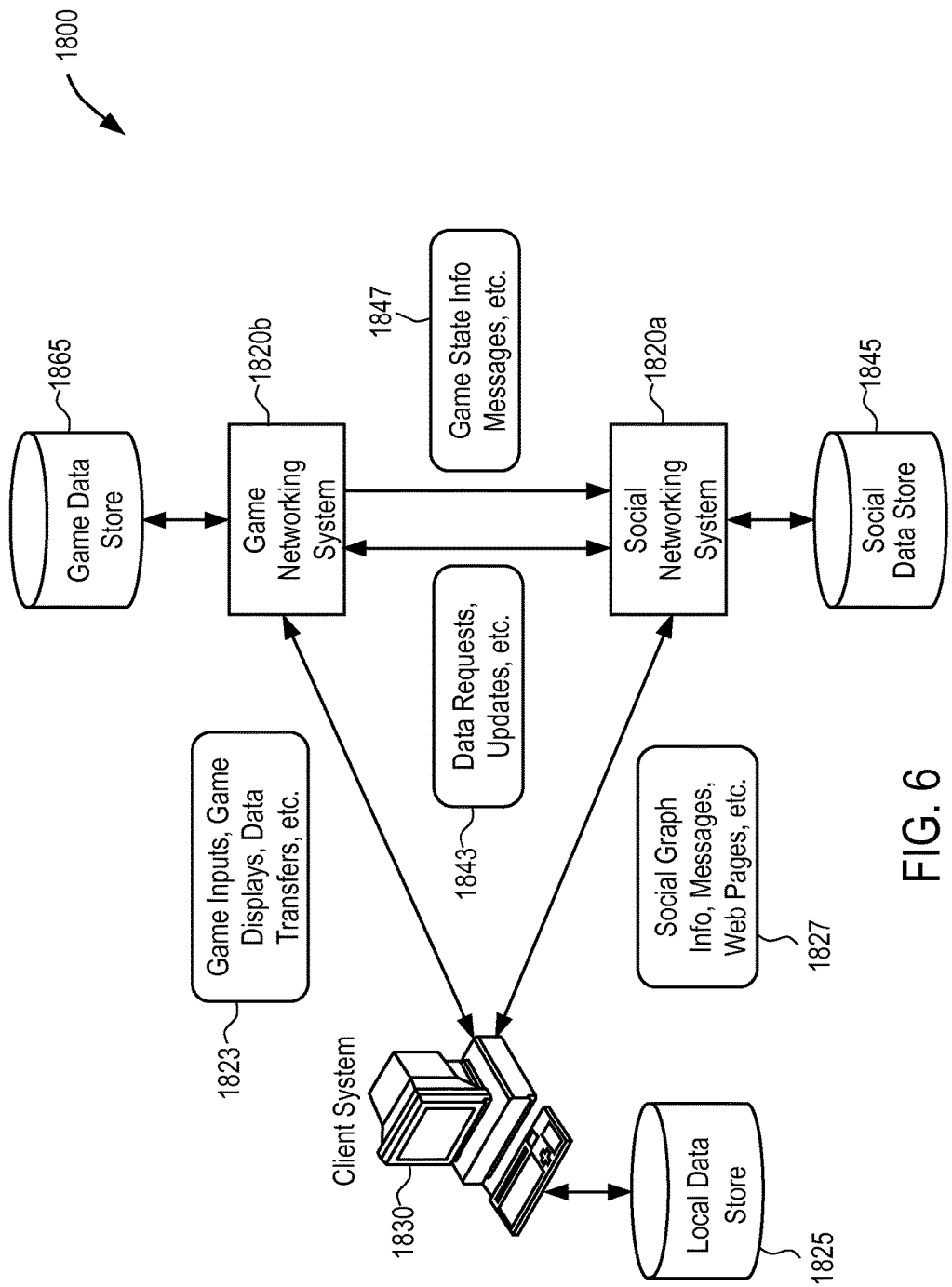
FIG. 6 illustrates data flow between example components of the example system of FIG. 1.

FIG. 6 shows an example data flow between example components of an example system 1800. One or more of the components of the example system 1800 may correspond to one or more of the components of the example system 100. In some embodiments, system 1800 includes a client system 1830, a social networking system 1820a, and a game networking system 1820b. The components of system 1800 can be connected to each other in any suitable configuration, using any suitable type of connection. The components may be connected directly or over any suitable network. The client system 1830, the social networking system 1820a, and the game networking system 1820b may have one or more corresponding data stores, such as the local data store 1825, the social data store 1845, and the game data store 1865, respectively.

The client system 1830 may receive and transmit data 1823 to and from the game networking system 1820b. This data can include, for example, a web page, a message, a game input, a game display, a HTTP packet, a data request, transaction information, and other suitable data. At some other time, or at the same time, the game networking system 1820b may communicate data 1843, 1847 (e.g., game state information, game system account information, page info, messages, data requests, updates, etc.) with other networking systems, such as the social networking system 1820a (e.g., Facebook, Myspace, etc.). The client system 1830 can also receive and transmit data 1827 to and from the social networking system 1820a. This data can include, for example, web pages, messages, social graph information, social network displays, HTTP packets, data requests, transaction information, updates, and other suitable data.

Communication between the client system 1830, the social networking system 1820a, and the game networking system 1820b can occur over any appropriate electronic communication medium or network using any suitable communication protocol. For example, the client system 1830, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a user accesses a virtual game on the game networking system 1820b, the BLOB containing the game state for the instance corresponding to the user may be transmitted to the client system 1830 for use by a client-side executed object to process. In some embodiments, the client-side executable is a FLASH-based game, which can de-serialize the game state data in the BLOB. As a user plays the game, the game logic implemented at the client system 1830 maintains and modifies the various game state parameters locally. The client-side game logic may also batch game events, such as mouse clicks, and transmit these events to the game networking system 1820b. Game networking system 1820b may itself operate by retrieving a copy of the BLOB from a database or an intermediate memory cache (memcache) layer. The game networking system 1820b can also de-serialize the BLOB to resolve the game state parameters and execute its own game logic based on the events in the batch file of events transmitted by the client to synchronize the game state on the server side. The game networking system 1820b may then re-serialize the game state, now modified into a BLOB, and pass this to a memory cache layer for lazy updates to a persistent database.

In some embodiments, a computer-implemented game is a text-based or turn-based game implemented as a series of web pages that are generated after a user selects one or more actions to perform. The web pages may be displayed in a browser client executed on the client system 1830. For example, a client application downloaded to the client system 1830 may operate to serve a set of web pages to a user. As another example, a virtual game may be an animated or rendered game executable as a stand-alone application or within the context of a webpage or other structured document. In some embodiments, the virtual game is implemented using Adobe Flash-based technologies. As an example, a game may be fully or partially implemented as a SWF object that is embedded in a web page and executable by a Flash media user plug-in. In some embodiments, one or more described web pages are associated with or accessed by the social networking system 1820a. This disclosure contemplates using any suitable application for the retrieval and rendering of structured documents hosted by any suitable network-addressable resource or website.

Application event data of a game is any data relevant to the game (e.g., user inputs or interations). In some embodiments, each application datum may have a name and a value, and the value of the application datum may change (e.g., be updated) at any time. When an update to an application datum occurs at the client system 1830, either caused by an action of a game user or by the game logic itself, the client system 1830 may need to inform the game networking system 1820*b* of the update. For example, if the game is a farming game with a harvest mechanic (such as FarmVille by Zynga), an event can correspond to a user clicking on a parcel of land to harvest a crop. In such an instance, the application event data may identify an event or action and an object in the game to which the event or action applies.

In some embodiments, one or more objects of a game are represented as an Adobe Flash object. Flash may manipulate vector and raster graphics, and supports bidirectional streaming of audio and video. "Flash" may mean the authoring environment, the user, or the application files. In some embodiments, the client system 1830 may include a Flash client. The Flash client may be configured to receive and run a Flash application or game object code from any suitable networking system (such as, for example, the social networking system 1820*a* or the game networking system 1820*b*). In some embodiments, the Flash client is run in a browser client executed on the client system 1830. A user can interact with Flash objects using the client system 1830 and the Flash client. The Flash objects can represent a variety of in-game objects. Thus, the user may perform various in-game actions on various in-game objects by making various changes and updates to the associated Flash objects.

In some embodiments, in-game actions are initiated by clicking or similarly interacting with a Flash object that represents a particular in-game object. For example, a user can interact with a Flash object to use, move, rotate, delete, scratch, attack, shoot, redeem virtual currency from a value object, or harvest an in-game object. This disclosure contemplates performing any suitable in-game action by interacting with any suitable Flash object. In some embodiments, when the user makes a change to a Flash object representing an in-game object, the client-executed game logic may update one or more game state parameters associated with the in-game object. To ensure synchronization between the Flash object shown to the user and the client system 1830, the Flash client may send the events that caused the game state changes to the in-game object to the game networking system 1820*b*. However, to expedite the processing and, hence, the speed of the overall gaming experience, the Flash client may collect a batch of some number of events or updates into a batch file. The number of events or updates may be determined by the Flash client dynamically or determined by the game networking system 1820*b* based on server loads or other factors. For example, client system 1830 may send a batch file to the game networking system 1820*b* whenever 50 updates have been collected or after a threshold period of time, such as every minute.

As used herein, the term "application event data" may refer to any data relevant to a computer-implemented virtual game application that may affect one or more game state parameters, including, for example and without limitation, changes to user data or metadata, changes to user social connections or contacts, user inputs to the game, and events generated by the game logic. The user profile data may include application event data. In some embodiments, each application datum has a name and a value. The value of an application datum may change at any time in response to the game play of a user or in response to the game engine (e.g., based on the game logic). In some embodiments, an application data update occurs when the value of a specific application datum is changed.

In some embodiments, when a user plays a virtual game on the client system 1830, the game networking system 1820*b* serializes all the game-related data, including, for example and without limitation, game states, game events, and user inputs, for this particular user and this particular game into a BLOB and may store the BLOB in a database. The BLOB may be associated with an identifier that indicates that the BLOB contains the serialized game-related data for a particular user and a particular virtual game. In some embodiments, while a user is not playing the virtual game, the corresponding BLOB may be stored in the database. This enables a user to stop playing the game at any time without losing the current state of the game the user is in. When a user resumes playing the game next time, game networking system 1820*b* may retrieve the corresponding BLOB from the database to determine the most-recent values of the game-related data. In some embodiments, while a user is playing the virtual game, the game networking system 1820*b* also loads the corresponding BLOB into a memory cache so that the game system may have faster access to the BLOB and the game-related data contained therein.

Figure 7:
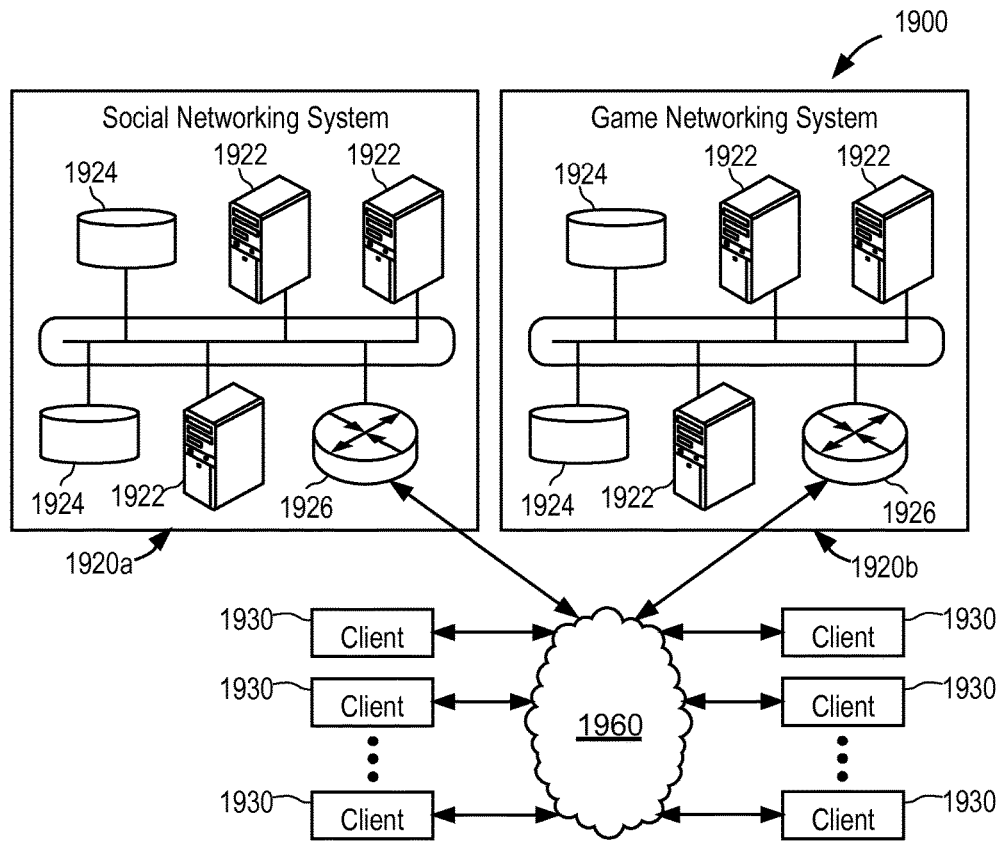
FIG. 7 illustrates an example network environment in which various embodiments may operate.

Various embodiments may operate in a WAN environment, such as the Internet, including multiple network addressable systems. FIG. 7 shows an example network environment 1900, in which various example embodiments may operate. A network cloud 1960 generally represents one or more interconnected networks, over which the systems and hosts described herein can communicate. Network cloud 1960 may include packet-based WANs (such as the Internet), private networks, wireless networks, satellite networks, cellular networks, paging networks, and the like. As FIG. 7 illustrates, various embodiments may operate in a network environment 1900 comprising one or more networking systems, such as a social networking system 1920*a*, a game networking system 1920*b*, and one or more client systems 1930. The components of the social networking system 1920*a* and the game networking system 1920*b* operate analogously; as such, hereinafter they may be referred to simply as the networking system 1920. The client systems 1930 are operably connected to the network cloud 1960 via a network service provider, a wireless carrier, or any other suitable means.

The networking system 1920 is a network addressable system that, in various example embodiments, comprises one or more physical servers 1922 and data stores 1924. The one or more physical servers 1922 are operably connected to computer network cloud 1960 via, by way of example, a set of routers and/or networking switches 1926. In an example embodiment, the functionality hosted by the one or more physical servers 1922 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 1922 may host functionality directed to the operations of the networking system 1920. Hereinafter servers 1922 may be referred to as server 1922, although the server 1922 may include numerous servers hosting, for example, the networking system 1920, as well as other content distribution servers, data stores, and databases. Data store 1924 may store content and data relating to, and enabling operation of, the networking system 1920 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like.

Logically, data store 1924 corresponds to one or more of a variety of separate and integrated databases, such as relational databases and object-oriented databases, that maintain information as an integrated collection of logically related records or files stored on one or more physical systems. Structurally, data store 1924 may generally include one or more of a large class of data storage and management systems. In some embodiments, data store 1924 may be implemented by any suitable physical system(s) including components, such as one or more database servers, mass storage media, media library systems, storage area networks, data storage clouds, and the like. In one example embodiment, data store 1924 includes one or more servers, databases (e.g., MySQL), and/or data warehouses. Data store 1924 may include data associated with different networking system 1920 users and/or client systems 1930.

The client system 1930 is generally a computer or computing device including functionality for communicating (e.g., remotely) over a computer network. The client system 1930 may be a desktop computer, laptop computer, tablet computer, in- or out-of-car navigation system, smart phone or other cellular or mobile phone, or mobile gaming device, among other suitable computing devices. Client system 1930 may execute one or more client applications, such as a Web browser.

When a user at a client system 1930 desires to view a particular webpage (hereinafter also referred to as target structured document) hosted by the networking system 1920, the user's web browser, or other document rendering engine or suitable client application, formulates and transmits a request to the networking system 1920. The request generally includes a URL or other document identifier as well as metadata or other information. By way of example, the request may include information identifying the user, a timestamp identifying when the request was transmitted, and/or location information identifying a geographic location of the user's client system 1930 or a logical network location of the user's client system 1930.

Although the example network environment 1900 described above and illustrated in FIG. 7 is described with respect to the social networking system 1920a and the game networking system 1920b, this disclosure encompasses any suitable network environment using any suitable systems. For example, a network environment may include online media systems, online reviewing systems, online search engines, online advertising systems, or any combination of two or more such systems.

Figure 8:
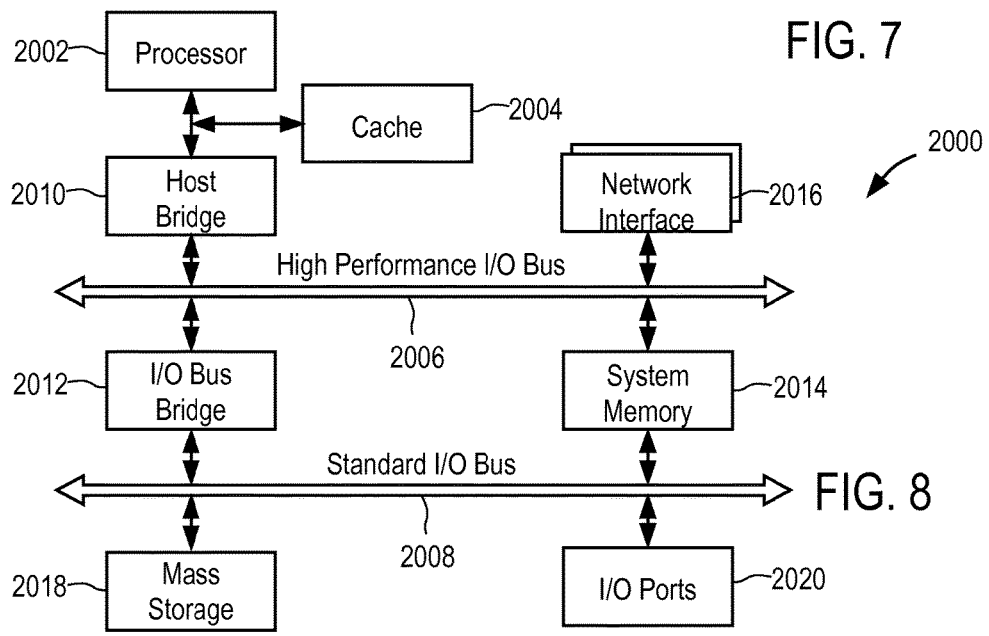
FIG. 8 illustrates example computing system architecture, which may be used to implement one or more of the methodologies described herein.

FIG. 8 illustrates an example computing system architecture, which may be used to implement a server 1922 or a client system 1930. In one embodiment, the hardware system 2000 comprises a processor 2002, a cache memory 2004, and one or more executable modules and drivers, stored on a tangible computer-readable storage medium, directed to the functions described herein. Additionally, the hardware system 2000 may include a high performance input/output (I/O) bus 2006 and a standard I/O bus 2008. A host bridge 2010 may couple the processor 2002 to the high performance I/O bus 2006, whereas the I/O bus bridge 2012 couples the two buses 2006 and 2008 to each other. A system memory 2014 and one or more network/communication interfaces 2016 may couple to the bus 2006. The hardware system 2000 may further include video memory (not shown) and a display device coupled to the video memory. Mass storage 2018 and I/O ports 2020 may couple to the bus 2008. The hardware system 2000 may optionally include a keyboard, a pointing device, and a display device (not shown) coupled to the bus 2008. Collectively, these elements are intended to represent a broad category of computer hardware systems.

The elements of the hardware system 2000 are described in greater detail below. In particular, the network interface 2016 provides communication between the hardware system 2000 and any of a wide range of networks, such as an Ethernet (e.g., IEEE 802.3) network, a backplane, or the like. The mass storage 2018 provides permanent storage for the data and programming instructions to perform the above-described functions implemented in servers 1922 of FIG. 7, whereas system memory 2014 (e.g., DRAM) provides temporary storage for the data and programming instructions when executed by the processor 2002. I/O ports 2020 are one or more serial and/or parallel communication ports that provide communication between additional peripheral devices, which may be coupled to the hardware system 2000.

The hardware system 2000 may include a variety of system architectures, and various components of the hardware system 2000 may be rearranged. For example, cache memory 2004 may be on-chip with the processor 2002. Alternatively, the cache memory 2004 and the processor 2002 may be packed together as a "processor module," with processor 2002 being referred to as the "processor core." Furthermore, certain embodiments of the present disclosure may neither require nor include all of the above components. For example, the peripheral devices shown coupled to the standard I/O bus 2008 may couple to the high performance I/O bus 2006. In addition, in some embodiments, only a single bus may exist, with the components of the hardware system 2000 being coupled to the single bus. Furthermore, the hardware system 2000 may include additional components, such as additional processors, storage devices, or memories.

An operating system manages and controls the operation of the hardware system 2000, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a," "an," or "the" is intended to mean "one or more" unless specifically indicated to the contrary. In addition, it is to be understood that functional operations, such as "awarding," "locating," "permitting," and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features, and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments, the term "web service" and "website" may be used interchangeably and, additionally, may refer to a custom or generalized API on a device, such as a mobile device (e.g., cellular phone, smart phone, personal GPS, PDA, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method comprising:
receiving, at an intermediate module, a request from a game application to display content that is outside of a current view presented in a display environment, the current view being with respect to a first game instance of the game application, the content being provided by a webview class of application, the request being received from a scrollview class of application that enables navigation from the current view to the content outside of the current view;
fetching one or more images of content from the webview class of application, including fetching one or more images of content associated with a game promotion for a second game instance of the game application;
storing the fetched one or more images of content at the intermediate module in response to the received request from the scrollview class of application; and
providing the fetched one or more images of content to the game application in response to the request to display content provided by the webview class of application, the providing including providing the one or more images of the content associated with the game promotion to the game application.

2. The method of claim 1, wherein the scrollview class of application displays an image of a game instance supported by the game application; and
wherein providing the fetched one or more images of content to the game application includes providing the fetched one or more images of content to the scrollview class of application.

3. The method of claim 1, wherein the webview class of application is a UIWebView application; and
wherein providing the fetched one or more images of content to the game application includes providing the fetched one or more images of content to a UIScrollView application associated with the game application.

4. The method of claim 1, wherein providing the fetched one or more images of content to the game application includes providing a first image captured of the content provided by the webview class of application to the game application and providing a second image captured of the content provided by the webview class of application to the game application.

5. The method of claim 1, wherein fetching one or more images of content from the webview class of application includes fetching one or more images of content associated with a game lobby of the game application, the game lobby providing access to a plurality of game instances of the game application; and
wherein providing the fetched one or more images of content to the game application includes providing images of the content associated with the game lobby to the game application.

6. The method of claim 1, wherein fetching one or more images of content from the webview class of application includes fetching one or more images of a website; and
wherein providing the fetched one or more images of content to the game application includes providing images of the website.

7. The method of claim 1, wherein providing the fetched one or more images of content to the game application includes displaying images of the fetched content within the game application when the game application is displaying images via a scrollview mode of operation.

8. A system comprising:
one or more modules configured to provide content received from a webview class of application to a scrollview class of application that enables navigation from a current view in a display environment to content outside of the current view, the current view being with respect to a first game instance provided by a game of the game application, the system comprising;
an image fetch module that is configured to fetch one or more images associated with content that is outside of the current view presented in the display environment and that is associated with a game promotion for a second game instance of the game application, the content being provided by a webview class of application in response to a request from the scrollview class of application that enables navigation from the current view to the content outside of the current view; and
an image provision module that is configured to provide to the scrollview class of application the one or more fetched images associated with the game promotion.

9. The system of claim 8, wherein the image fetch module is configured to generate images of content provided by a UIWebView application; and
wherein the image provision module is configured to provide the generated images to a UIScrollView application.

10. The system of claim 8, wherein the image fetch module is further configured to fetch images from a web page.

11. The system of claim 8, wherein the image fetch module is configured to fetch images from dynamically changing content displaying an online game presented by a game application.

12. The system of claim 8, wherein the image provision module is configured to provide the one or more fetched images to a game application displaying an online game via the scrollview class of application.

13. The system of claim 8, wherein the image fetch module and the image provision module are part of a game application that supports an online game presented to users via a mobile-based application.

14. A computer-readable storage medium whose contents, when executed by a computing system, enable the computing system to perform operations comprising:
   providing an online game via a scrollview class of application that enables players of the game to navigate the online game including navigation from a current view presented in a display environment to content outside of the current view, the current view being with respect to a first game instance supported by a game application; and
   presenting dynamically changing content within the online game by:
      capturing one or more images of content that is outside of the current view presented in the display environment, the content being provided by a webview class of application in response to a request from the scrollview class of application, the dynamically changing content including content from a promotion associated with a second game instance supported by game application supporting the online game; and
      causing the online game to display within the online game the one or more captured images associated with the promotion for the second game instance.

15. The computer-readable storage medium of claim 14, wherein providing an online game via a scrollview class of application includes providing an online game via a UIScrollView application; and
   wherein capturing images of content provided by a webview class of application includes capturing images of content provided by a UIWebView application.

16. The computer-readable storage medium of claim 14, wherein the dynamically changing content includes content from a web site.

17. The computer-readable storage medium of claim 14, wherein the dynamically changing content includes content from another online game supported by the game application.

* * * * *